(12) United States Patent
Liu et al.

(10) Patent No.: US 11,386,718 B2
(45) Date of Patent: Jul. 12, 2022

(54) DISPLAY MODULE, AND DISPLAY METHOD AND TERMINAL THEREOF

(71) Applicants: BOE Technology Group Co., Ltd., Beijing (CN); Chengdu BOE Optoelectronics Technology Co., Ltd., Chengdu (CN)

(72) Inventors: Lianbin Liu, Beijing (CN); Chuanyan Lan, Beijing (CN); Lixia Shen, Beijing (CN); Yong Yu, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 751 days.

(21) Appl. No.: 16/305,174

(22) PCT Filed: May 10, 2018

(86) PCT No.: PCT/CN2018/086438
§ 371 (c)(1),
(2) Date: Nov. 28, 2018

(87) PCT Pub. No.: WO2019/041884
PCT Pub. Date: Mar. 7, 2019

(65) Prior Publication Data
US 2021/0256283 A1 Aug. 19, 2021

(30) Foreign Application Priority Data
Aug. 28, 2017 (CN) .......................... 201710752717.5

(51) Int. Cl.
*G06V 40/60* (2022.01)
*G09G 3/3225* (2016.01)
(Continued)

(52) U.S. Cl.
CPC .......... *G06V 40/67* (2022.01); *G06V 40/1318* (2022.01); *G09G 3/3225* (2013.01); *G09G 5/10* (2013.01); *G09G 5/34* (2013.01)

(58) Field of Classification Search
CPC .... G06K 9/00912; G06K 9/0004; G06K 9/00; G09G 3/3225; G09G 5/10; G09G 5/34;
(Continued)

(56) References Cited

U.S. PATENT DOCUMENTS

2017/0091521 A1   3/2017   Tieu
2017/0220842 A1*  8/2017   Thompson .............. G06F 1/169

FOREIGN PATENT DOCUMENTS

CN   102902484 A   1/2013
CN   106648576 A   5/2017
(Continued)

OTHER PUBLICATIONS

International Search Report dated Jul. 2, 2018 from PCT/CN2018/086438.

*Primary Examiner* — Abhishek Sarma
(74) *Attorney, Agent, or Firm* — Fay Sharpe LLP (57) ABSTRACT

The present disclosure provides a display module, and a display method and a terminal thereof, in the field of display technology. The display module includes a display panel and a control circuit; wherein the control circuit is configured to control a target region on the display panel to display a target image when the display panel is in an off-screen state, and the target region includes a fingerprint collection region. The present disclosure solves the problem that fingerprint collection operations on the terminal in the related art are complicated, and reliability is poor. The present disclosure is for fingerprint collection.

17 Claims, 5 Drawing Sheets

(51) Int. Cl.
*G09G 5/10* (2006.01)
*G09G 5/34* (2006.01)
*G06V 40/13* (2022.01)

(58) Field of Classification Search
CPC ....... G09G 2320/043; G09G 2330/022; G09G 2354/00; G09G 2358/00; G06F 3/0484; H04M 1/22; H04M 1/725; G06V 40/67; G06V 40/1318
See application file for complete search history.

(56) References Cited

FOREIGN PATENT DOCUMENTS

| | | |
|---|---|---|
| CN | 106716431 A | 5/2017 |
| CN | 107017996 A | 8/2017 |
| CN | 206400421 U | 8/2017 |
| CN | 107566628 A | 1/2018 |

* cited by examiner

DISPLAY MODULE, AND DISPLAY METHOD AND TERMINAL THEREOF

This application is a 371 of PCT Patent Application Ser. No. PCT/CN2018/086438, filed May 11, 2018, which claims priority to Chinese Patent Application No. 201710752717.5, filed on Aug. 28, 2017 and titled "DISPLAY MODULE, AND DISPLAY METHOD AND TERMINAL THEREOF", the entire contents of which are incorporated herein by reference.

TECHNICAL FIELD

The present disclosure relates to a display module, and a display method and a terminal thereof.

BACKGROUND

With the rapid development of display technologies, full-screen display is achieved for terminals. In the terminal with full-screen display, the Home key (main key) for fingerprint collection is canceled. Therefore, if the fingerprint collection function needs to be implemented on the side of a display surface of the terminal, the fingerprint collection may only be arranged in a display region of the terminal.

The display module in the terminal generally includes a self light-emitting display panel, a glass cover that is located on the side of the display surface of the display panel, and a protective film layer that is located on the side of a non-display surface of the display panel. In the related art, for practice of the fingerprint collection function in the target region of the terminal, a pressure sensor needs to be integrated in the fingerprint collection region on the glass cover. The pressure sensor is connected to a drive integrated circuit (IC) of the display panel, and an aperture is formed on the protective film layer. An optical fingerprint sensor is arranged in the aperture. A front projection of the aperture on the glass cover coincides with the fingerprint collection region. When a user performs the unlocking by using the fingerprint, the pressure sensor in the fingerprint collection region on the glass cover can receive a pressure touch operation, and the drive IC on the display panel may light pixels in a region covered by the front projection of the fingerprint collection region on the display panel. Light emitted by the pixels in this region may be reflected to the optical fingerprint sensor via fingerprint ridges and fingerprint valleys of the fingerprint, and then may be processed by a processing subcircuit connected to the optical fingerprint sensor in the terminal for subsequent processes such as fingerprint matching and analyzing.

SUMMARY

The present disclosure provides a display module, and a display method and a terminal thereof.

In a first aspect, there is provided a display module, comprising: a display panel and a control circuit; wherein the control circuit is configured to control a target region on the display panel to display a target image when the display panel is in an off-screen state, the target region comprising a fingerprint collection region.

Optionally, the control circuit comprises a processing subcircuit and an integrated circuit (IC); wherein the processing subcircuit is configured to generate a control signal according to the target image, and send the control signal to the IC; and the IC is configured to light pixels in the target region according to the control signal, to display the target image.

Optionally, the target image is a ripple-like pattern, ripples in the ripple-like pattern being scroll displayed according to rules.

Optionally, each of the pixels that are lit in the target region has the same display duration and brightness.

Optionally, the ripples in the ripple-like pattern are fingerprints.

Optionally, the target image comprises a plurality of sequentially arranged pictures, the plurality of sequentially arranged pictures being cyclically displayed on the target region.

In a second aspect, there is provided a display method of a display module, the display module comprising a display panel and a control circuit, and the method comprising: upon receiving a turn-off screen instruction, controlling, by the control circuit, a display region on the display panel to display a target image, wherein the target region comprises a fingerprint collection region, and the turn-off screen instruction indicates that the display panel enters a screen-off state.

Optionally, the control circuit comprises a processing subcircuit and an integrated circuit (IC), and the controlling, by the control circuit, a display region on the display panel to display a target image comprises: generating, by the processing subcircuit, a control signal according to the target image, and sending the control signal to the IC; and lighting, by the IC, pixels in the target region according to the control signal, to display the target image.

Optionally, the target image is a ripple-like pattern; and the lighting, by the IC, pixels in the target region according to the control signal comprises: periodically lighting, by the IC, n columns of specified pixels in the target region according to a first brightness value, such that the ripples in the ripple-like pattern are scroll displayed according to the rules, n≥1, n being a positive integer.

Optionally, the lighting, by the IC, pixels in the target region according to the control signal comprises: Optionally, periodically lighting, by the IC, m columns of specified pixels in the target region according to a second brightness value, such that the ripples in the ripple-like pattern are scroll displayed according to the predefined rules; wherein the second brightness value is n/m of the first brightness value, m≥n, m being a positive integer.

Optionally, each of the pixels that are lit in the target region has the same display duration and brightness.

Optionally, the ripples in the ripple-like pattern are fingerprints.

Optionally, the target image comprises a plurality of sequentially arranged pictures; and the controlling, by the control circuit, a display region on the display panel to display a target image comprises: controlling, by the control circuit, the target region on the display panel to cyclically display the plurality of sequentially arranged pictures.

Optionally, the method further comprises: upon receiving a turn-on screen instruction, controlling, by the control circuit, the display panel to display to an image to be displayed, wherein the turn-on screen instruction indicates that the display panel enters a screen-on state.

In a third aspect, there is provided a terminal, comprising an optical fingerprint sensor and any one of the display modules as defined in the first aspect, wherein the display module further comprises a protective film layer, the optical fingerprint sensor is arranged in an aperture of the protective film layer, the optical fingerprint sensor is electrically connected to the processing subcircuit of the display module, and a front projection of the aperture on the display panel coincides with the fingerprint collection region; the optical fingerprint sensor is configured to detect an optical signal reflected by a pattern of the fingerprint, and generate a current signal according to the optical signal, wherein the optical signal is formed after light emitted by the target image is reflected by the pattern of the fingerprint; the processing subcircuit is configured to acquire the current signal; and the processing subcircuit is further configured to identify the pattern of the fingerprint according to the current signal.

In a fourth aspect, there is provided a computer-readable storage medium having computer programs stored therein, wherein the computer programs, when executed by a processor, implement the display method of a display module in the second aspect.

In a fifth aspect, there is provided a computer program product that, when executed by a processor, implement the display method of a display module in the second aspect.

DETAILED DESCRIPTION

To make the principles and advantages of the present disclosure clearer, embodiments of the present disclosure are described hereinafter in detail with reference to the accompanying drawings.

In the related art, although a fingerprint collection function may be implemented on a display region of a terminal, when the terminal is in a screen-off state, a user fails to determine the position of a fingerprint collection region, and needs to repeatedly attempt to determine the position of the fingerprint collection region. As a result, operations for fingerprint collection on the terminal are complicated, and reliability is poor.

Figure 1:
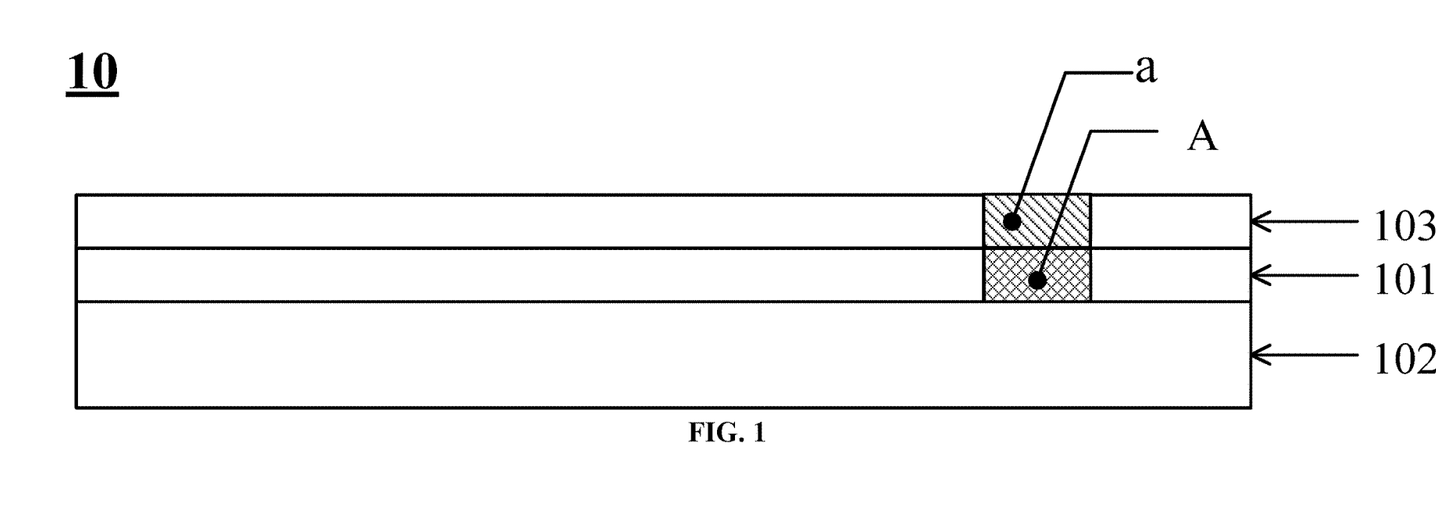
FIG. 1 is a schematic diagram of a structure of a display module according to an embodiment of the present disclosure.

In view of the above problems, there is provided in an embodiment of the present application a display module 10. As illustrated in FIG. 1, the display module 10 includes:

a display panel 101 and a control circuit (not illustrated in FIG. 1).

Herein, the control circuit is configured to control a target region A on the display panel 101 to display a target image when the display panel 101 is in a screen-off state, where the target region A includes a fingerprint collection region a. The control circuit is connected to the display panel 101.

Further, as illustrated in FIG. 1, the display module 10 may further include: a protective film layer 102 that is located on the side of a non-display surface of the display panel 101, and a transparent cover 103 that is located on the side of a display surface of the display panel 101.

Herein, the protective film layer may include a foam layer, a graphite layer and a copper foil layer that are sequentially arranged along a direction away from the display panel. The protective film layer may be configured to secure the display panel. In addition, the protective film layer may also achieve the effect of heat dissipation.

The transparent cover may be a glass cover.

Optionally, the area covered by a front projection of the finger collection region a of the transparent cover 103 on the display panel 101 may completely coincide with the target region A on the display panel 101; or the area covered by a front projection of the finger collection region a of the transparent cover 103 on the display panel 101 may be located in the target region A on the display panel.

Optionally, the display panel may be a self light-emitting display panel. For example, the display panel may be an organic light emitting diode (OLED) display panel. The OLED display panel employs an organic semiconductor material and a luminous material to emit light under current driving to achieve display, and the OLED display panel has the advantages such as self-luminousness, low power consumption, high brightness, ultra-thinness, flexibility and the like.

In summary, in the display module according to the embodiments of the present disclosure, when the display panel is in the screen-off state, the control circuit may control the target region on the display panel to display the target image; and since the target region includes the fingerprint collection region, the display module may display the target region in the fingerprint collection region when the display panel is in the screen-off state, so as to indicate the position of the fingerprint collection region of the user. The user does not need to repeatedly attempt to determine the position of the fingerprint collection region, which simplifies fingerprint collection operations and improves the reliability of fingerprint collection.

Optionally, for the sake of saving power to improve endurance power of the terminal, the terminal includes the display module according to the embodiments of the present disclosure, and the target region may be defined to have a smaller area. For example, the target region may be defined as a rectangular region, which may be 1 cm×1 cm in size. That is, the target region has a length of 1 cm and a width of 1 cm. Exemplarily, the terminal including the display module according to the embodiments of the present disclosure may be an active-matrix organic light-emitting diode (AMOLED) display device. The AMOLED display device displays data via electroluminescence of an organic luminous material, and has the advantages of flexibility, thinness, low power consumption, fast response, high contrast and the like.

Further, a time period for displaying the target image in the target region on the display panel may be defined. In other time periods except the time period, when the display panel is in the screen-off state, the target region may not display images. For example, the time period that is defined for displaying the target image in the target region may be 8:00 to 22:00, and the time periods except the time period of 8:00 to 22:00, the target region does not display any image when the display panel is in the screen-off state.

It should be noted that the time period for displaying the target image in the target region on the display panel may be predefined in the control circuit of the display module, and when the control circuit controls the target region on the display panel to display the target image, the control may be practiced according to the predefined time period. In addition, the time period for displaying the target image in the target region on the display panel may also be defined by the user on the terminal according to the actual needs. The time period for displaying the target image in the target region on the display panel and the manner of defining the time period for displaying the target image in the target region are not limited in the embodiments of the present disclosure.

Optionally, the control circuit may include a processing subcircuit and an integrated circuit (IC). The processing subcircuit is configured to generate a control signal according to the target image, and send the control signal to the IC; and the IC is configured to light pixels in the target region according to the control signal, to display the target image.

In a practical application, the target images may be displayed on the target region of the display panel in a plurality of manners, and the following two display manners are taken as examples for description in the embodiments of the present disclosures.

In a first display manner, the target image may be a ripple-like pattern. The ripples in the ripple-like pattern may be scroll displayed according to rules. Since the ripples in the ripple-like pattern may be scroll displayed according to the rules, the same pixel in the target region does not need to constantly emit light. Therefore, while ensuring the reliability of fingerprint collection, the display module may also prolong the life time of the electroluminescent material in the pixels in the target region.

Figure 2A:
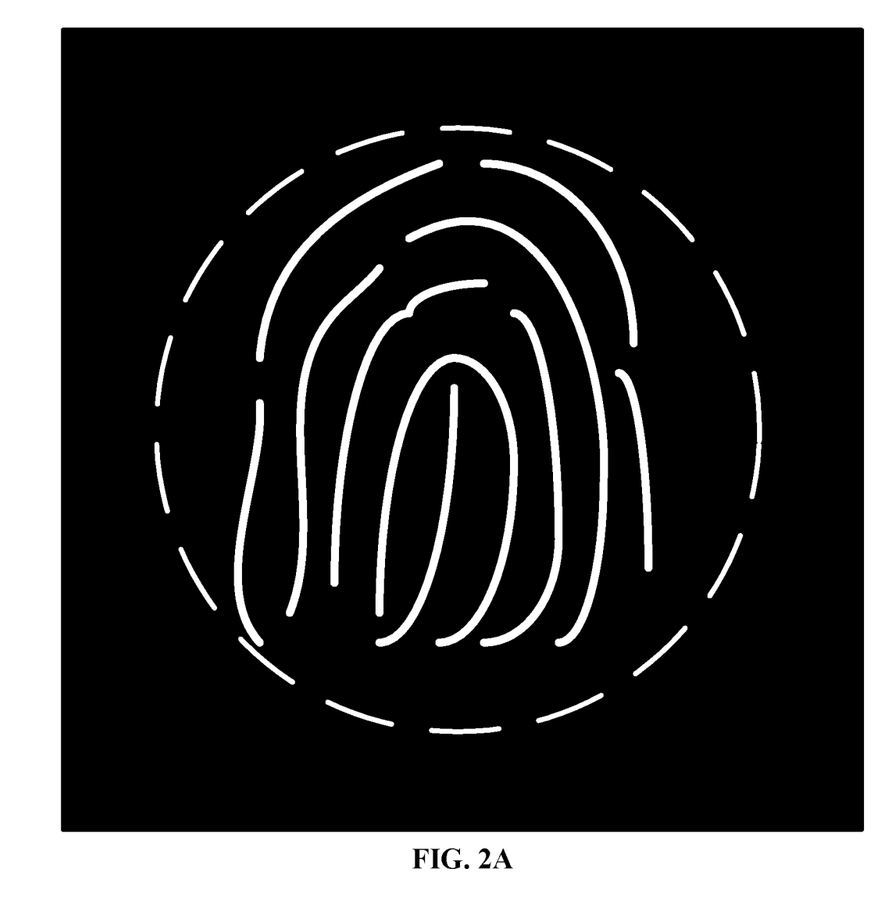
FIG. 2A is a schematic diagram of a ripple-like pattern according to an embodiment of the present disclosure.
Figure 2B:
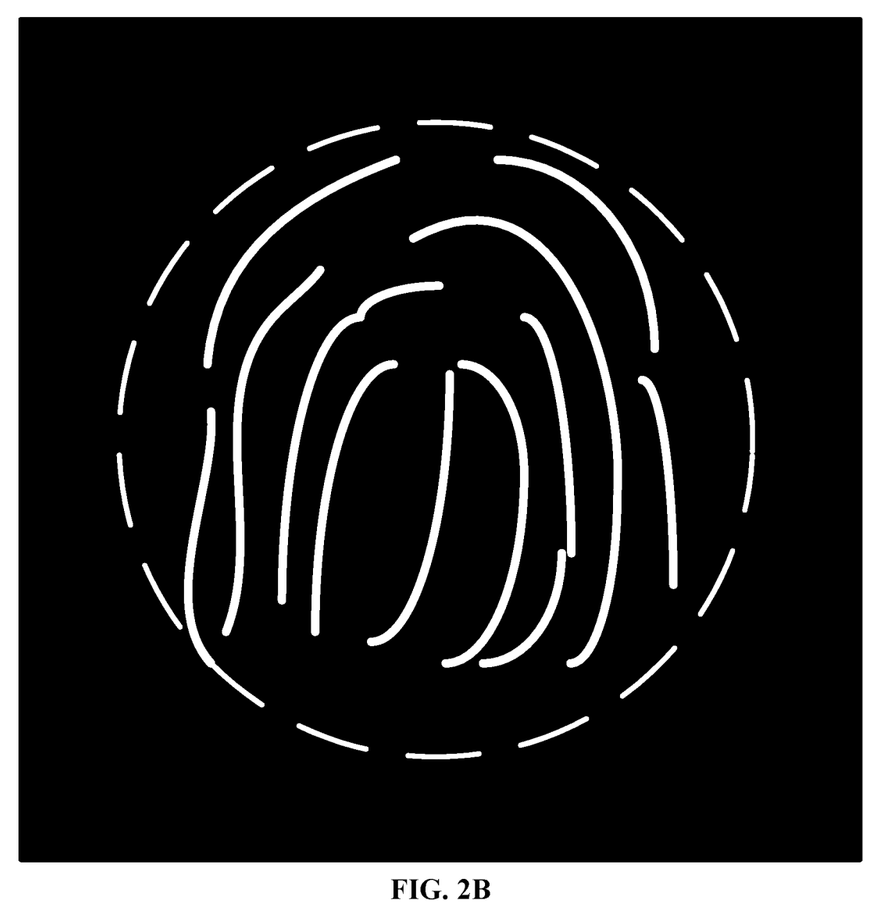
FIG. 2B is a schematic diagram of another ripple-like pattern according to an embodiment of the present disclosure.

Optionally, the ripples in the ripple-like pattern may be fingerprints. Exemplarily, the ripple-like pattern may be as illustrated in FIG. 2A or FIG. 2B. Herein, the fingerprints in the ripple-like pattern may be scroll displayed according to rules. For example, within a first time period, the ripple-like pattern is as illustrated in FIG. 2A; and within a second time period, the ripple-like pattern is as illustrated in FIG. 2B. In the present disclosure, the control circuit may light different pixels in the target region within different time periods, to control the fingerprints in the ripple-like pattern to be roll displayed according to the rules. As a result, different ripple-like patterns are formed. The rules may be from top to bottom, from left to right or from interior to exterior, which are not limited in the embodiments of the present disclosure.

Optionally, the manner of controlling the fingerprints in the ripple-like pattern to be scroll displayed according to the rules may include: periodically sending different control signals by the processing subcircuit to the IC, wherein the control signals that are sent may be programmed in advance in the processing subcircuit; and periodically lighting specified pixels in the target region by the IC according to the control signals, wherein, for example, the IC lights the specified pixels in the target region within the first time period according to the control signals to obtain the ripple-like pattern as illustrated in FIG. 2A, and the IC lights the specified pixels in the target region within the second time period according to the control signals to obtain the ripple-like pattern as illustrated in FIG. 2B.

Optionally, each of the pixels that are lit in the target region has the same display duration and brightness. For example, the display duration of each pixel in the target region is 5 seconds, and the display brightness of each pixel is the same. This prolongs the life time of the electroluminescent material in the pixels in the target region while ensuring the reliability of fingerprint collection. In addition, the display brightness of the target image is more uniform.

In a second display manner, the target image may include a plurality of sequentially arranged pictures, wherein the plurality of sequentially arranged pictures are cyclically displayed in the target region. Correspondingly, the control circuit is specifically configured to control the target region on the display panel to cyclically display the plurality of sequentially displayed pictures when the display panel is in the screen-off state. Herein, the target region on the display panel may constantly cyclically display one of the plurality of sequentially arranged pictures, or blinkingly cyclically display one of the plurality of sequentially arranged pictures. When one of the plurality of sequentially arranged pictures is blinkingly cyclically displayed in the target region, a light-emitting duration of the pixels may be shortened, and the life time of the electroluminescent material in the pixels may be prolonged.

When the control circuit controls the target region on the display panel to cyclically display the plurality of sequentially arranged pictures, exemplarily, the control circuit may control the target region on the display panel to change and display a picture every 5 seconds.

The control circuit controls the target region on the display panel to cyclically display the plurality of sequentially arranged pictures, such that the pixels in the target region are lit in turn. In this case, the same pixel may not constantly emit light. Therefore, while the reliability of fingerprint collection is ensured, the display module may also prolong the life time of the electroluminescent material in the pixels in the target region.

Exemplarily, assume that within the first time period, the target region on the display panel displays a first picture, within the second time period, the target region on the display panel displays a second picture, and the first picture is different from the second picture. Then the control circuit controls the target region on the display panel to cyclically display the first picture and the second picture. In this case, the same pixel may not be constantly lit. This prolongs the life time of the electroluminescent material in the pixels in the target region.

Optionally, the plurality of sequentially arranged pictures may be pictures provided in the terminal including the display module. In addition, the plurality of sequentially arranged pictures may also be pre-stored to the terminal by the user according to the actual needs. When the display panel is in the screen-off state, the control circuit may sequentially parse the plurality of pictures via the processing subcircuit, and generate a control signal. Upon receiving the control signal, the IC lights the pixels in the target region to display the plurality of pictures.

It should be noted that the control circuit may be further configured to control the target region on the display panel to normally display an image to be displayed when the display panel is in a screen-on state.

In summary, there is provided a display module in the embodiments of the present disclosure, which may control the target region on the display panel to display the target image when the display panel is in a blanking state; and since the target region includes the fingerprint collection region, the display module may display the target region in the fingerprint collection region when the display panel is in the screen-off state, so as to instruct the position of the fingerprint collection region of the user. The user does not need to repeatedly attempt to determine the position of the fingerprint collection region, which simplifies fingerprint collection operations and improves the reliability of fingerprint collection.

There is provided in an embodiment of the present disclosure a display method of a display module. The display module is the display module described in the above embodiments, and may be, exemplarily, the display module 10 as illustrated in FIG. 1. The display module includes a display panel and a control circuit. The method may include the following steps:

upon receiving a turn-off screen instruction, controlling, by the control circuit, a display region on the display panel to display a target image, wherein the target region comprises a fingerprint collection region, and the turn-off screen instruction indicates that the display panel enters a screen-off state.

Further, as illustrated in FIG. 1, the display module 10 may further include: a protective film layer 102 that is located on the side of a non-display surface of the display panel 101, and a transparent cover 103 that is located on the side of a display surface of the display panel 101.

Herein, the protective film layer may include a foam layer, a graphite layer and a copper foil layer that are sequentially arranged along a direction away from the display panel. The protective film layer may be configured to secure the display panel. In addition, the protective film layer may achieve the effect of heat dissipation.

The transparent cover may be a glass cover.

Optionally, the area covered by a front projection of the finger collection region a of the transparent cover 103 on the display panel 101 may completely coincide with the target region A on the display panel 101; or the area covered by a front projection of the finger collection region a of the transparent cover 103 on the display panel 101 may be located in the target region A on the display panel.

Optionally, the display panel may be a self light-emitting display panel. For example, the display panel may be an OLED display panel.

In summary, the display method of a display module according to the embodiments of the present disclosure can be applied to the display module, upon receiving the turn-off screen instruction, the control circuit may control the target region on the display panel to display the target image; and since the target region includes the fingerprint collection region, the display module may display the target region in the fingerprint collection region when the display panel is in the screen-off state, so as to indicate the position of the fingerprint collection region of the user. The user does not need to repeatedly attempt to determine the position of the fingerprint collection region, which simplifies fingerprint collection operations and improves the reliability of fingerprint collection.

Optionally, the control circuit may include a processing subcircuit and an IC; and the controlling, by the control circuit, a target region on the display panel to display a target image may include:

generating, by the processing subcircuit, a control signal according to the target image, and sending the control signal to the IC; and lighting, by the IC, pixels in the target region according to the control signal, to display the target image.

Optionally, the target image may be a ripple-like pattern; and correspondingly, the lighting, by the IC, pixels in the target region may include:

periodically lighting, by the IC, n columns of specified pixels in the target region according to a first brightness value, such that the ripples in the ripple-like pattern are scroll displayed according to a rule, n≥1, n being a positive integer.

Optionally, the ripples in the ripple-like pattern may be fingerprints. Exemplarily, the ripple-like pattern may be as illustrated in FIG. 2A or FIG. 2B. Exemplarily, within the first time period, the ripple-like pattern is as illustrated in FIG. 2A; and within the second time period, the ripple-like pattern is as illustrated in FIG. 2B. In the present disclosure, the control circuit may light different pixels in the target region within different time periods, to control the fingerprints in the ripple-like pattern to be scroll displayed according to rules, thereby forming different ripple-like patterns. The rules may be from top to bottom, from left to right or from interior to exterior, which are not limited in the embodiments of the present disclosure. Herein, the first time period and the second time period may be the same, for example, 5 seconds.

Optionally, each of the pixels that are lit in the target region has the same display duration and brightness. For example, the display duration of each pixel in the target region is 5 seconds, and the display brightness of each pixel is the same. This prolongs the life time of the electroluminescent material in the pixels in the target region while ensuring reliability of fingerprint collection. In addition, the display brightness of the target image is more uniform.

To enable the processing subcircuit of the display module to effectively identify the fingerprint pattern, during fingerprint collection, the intensity of the lights irradiated on the fingerprint pattern needs to reach a specific threshold, to ensure that the optical fingerprint sensor is capable of detecting an optical signal reflected by the fingerprint pattern, and generating a current signal. Therefore, the brightness of the target image displayed in the target region on the display panel needs to reach the threshold.

Further, since the ripple-like pattern displayed in the target region is used to indicate the position of the fingerprint collection region of the user, the display effect of the ripple-like pattern displayed in the target region may not be specifically required. For example, fuzzy processing may be performed when the ripple-like pattern is displayed. In this case, the lighting, by the IC, pixels in the target region according to the control signal may include:

periodically lighting, by the IC, m columns of specified pixels in the target region according to a second brightness value, such that the ripples in the ripple-like pattern are scroll displayed according to rules; wherein the second brightness value is n/m of the first brightness value, m>n, m being a positive integer.

When the ripple-like pattern is displayed, increase of the number of columns of the pixels may reduce the brightness value of each pixel that is lit, such that the life time of the electroluminescent material in the pixels in the target region may be prolonged.

Figure 3:
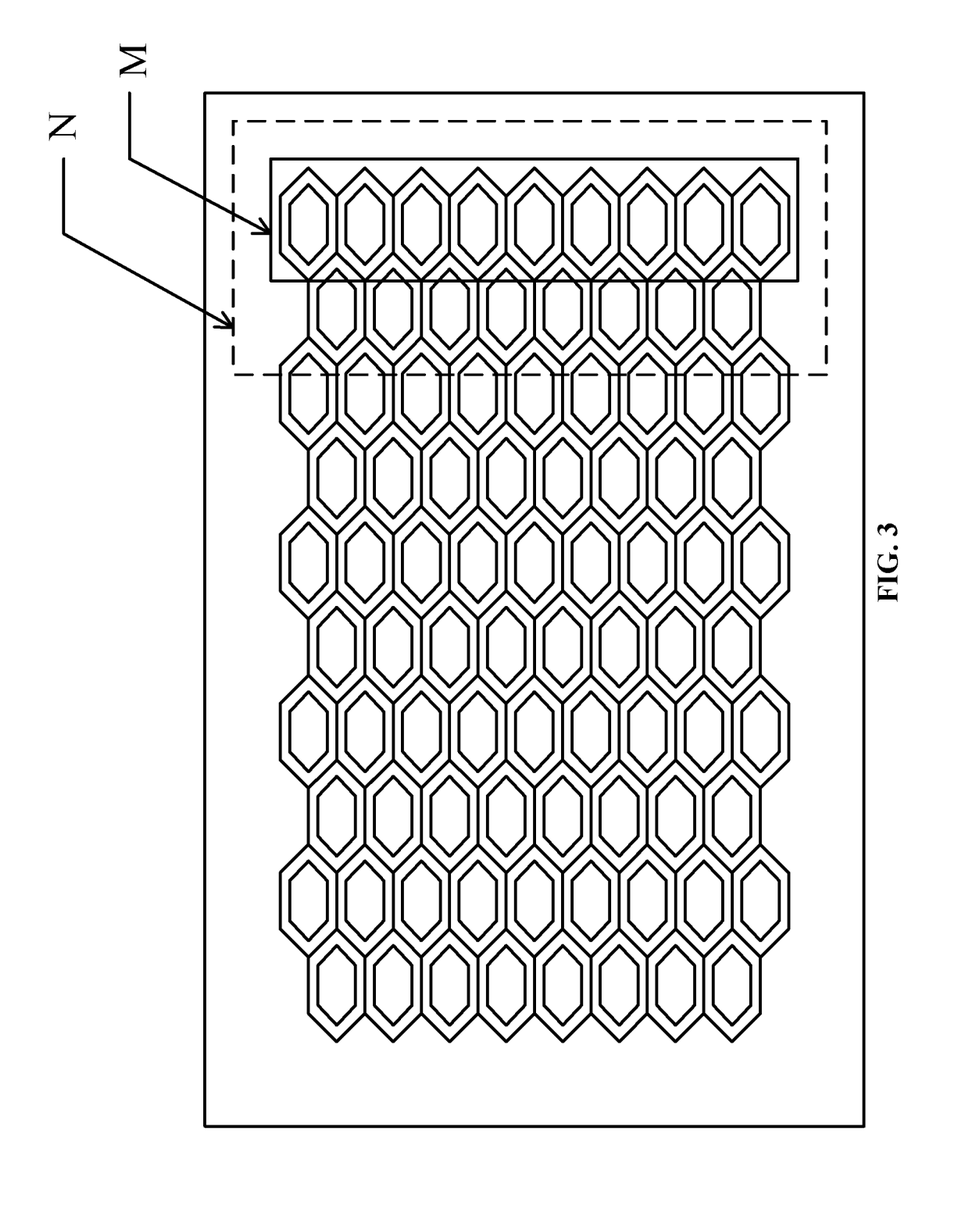
FIG. 3 is a schematic diagram of a structure of a pixel corresponding to a ripple in a ripple-like pattern according to an embodiment of the present disclosure.

Exemplarily, n is 1, and m is 2. As illustrated in FIG. 3, pixels in the solid-line block M are one column of specified pixels, and pixels in the dotted-line block N are two columns of specified pixels. Assume that the first brightness value is Q, and the second brightness value is Q/2, in this case, when the ripple-like pattern is displayed, the IC may light the pixels in the solid-line block M according to the first brightness value Q based on the control signal, or light the pixels in the dotted-line block N according to the second brightness value Q/2 based on the control signal. When the IC lights the pixels in the dotted-line block N according to the second brightness value Q/2 based on the control signal, as compared with the manner of lighting the pixels in the solid-line block M according to the first brightness value Q, the brightness of the pixels is smaller. Therefore, the life time of the electroluminescent material in the pixels in the target region may be prolonged.

Optionally, the target image may include a plurality of sequentially arranged pictures, and the controlling, by the control circuit, a display region on the display panel to display a target image may include:

controlling, by the control circuit, the target region on the display panel to cyclically display the plurality of sequentially arranged pictures.

Herein, the target region on the display panel may constantly cyclically display one of the plurality of sequentially arranged pictures, or blinkingly cyclically display one of the plurality of sequentially arranged pictures. When one of the plurality of sequentially arranged pictures is blinkingly cyclically displayed in the target region, a light-emitting duration of the pixels may be shortened, and the life time of the electroluminescent material in the pixels may be prolonged.

When the control circuit controls the target region on the display panel to cyclically display the plurality of sequentially arranged pictures, exemplarily, the target region on the display panel may change and display a picture every 5 seconds.

The control circuit controls the target region on the display panel to cyclically display the plurality of sequentially arranged pictures, such that the pixels in the target region are lit in turn. In this case, the same pixel may not constantly emit light. Therefore, while the reliability of fingerprint collection is ensured, the display module may prolong the life time of the electroluminescent material in the pixels in the target region.

Exemplarily, assume that within the first time period, the target region on the display panel displays a first picture, within the second time period, the target region on the display panel displays a second picture, and the first picture is different from the second picture. Then the control circuit controls the target region on the display panel to cyclically display the first picture and the second picture. In this case, the same pixel may not be constantly lit. This prolongs the life time of the electroluminescent material in the pixels in the target region.

Optionally, the plurality of sequentially arranged pictures may be pictures provided on the terminal including the display module. In addition, the plurality of sequentially arranged pictures may also be pre-stored to the terminal by the user according to the actual needs. Upon receiving a turn-off screen instruction, the control circuit may sequentially parse the plurality of pictures via the processing subcircuit, and generate a control signal. Upon receiving the control signal, the IC lights the pixels in the target region to display the plurality of pictures.

Further, the display method of a display module may further include:

upon receiving a turn-on screen instruction, controlling, by the control circuit, the display panel to display to an image to be displayed, wherein the turn-on screen instruction indicates that the display panel enters a screen-on state.

That is, when the display panel is in the screen-on state, the target region on the display panel normally displays the image to be displayed.

In summary, the display method of a display module according to the embodiments of the present disclosure can be applied to the display module. Upon receiving the turn-off screen instruction, the control circuit may control the target region on the display panel to display the target image; and since the target region includes the fingerprint collection region, the display module may display the target region in the fingerprint collection region when the display panel is in the screen-off state, so as to indicate the position of the fingerprint collection region of the user. The user does not need to repeatedly attempt to determine the position of the fingerprint collection region, which simplifies fingerprint collection operations and improves the reliability of fingerprint collection.

A person skilled in the art would clearly acknowledge that for ease and brevity of description, the operation processes in the method embodiments may be referenced to the relevant operating processes of various modules in the above described apparatus embodiments, which are thus not described herein any further.

There is further provided a chip in an embodiment of the present disclosure. The chip includes a programmable logic circuit and/or a program instruction, wherein the chip, when being run, performs the display method of a display panel according to the above embodiments.

There is further provided a computer-readable storage medium in an embodiment of the present disclosure. The computer-readable storage medium is a non-volatile readable storage medium. The storage medium stores a computer program; wherein the computer program, when being executed by a processor, causes the processor to perform the display method of a display panel according to the above embodiments.

There is further provided in an embodiment of the present disclosure a computer program product including instructions; wherein the instructions, when being executed on a computer, cause the computer to perform the display method of a display panel according to the above embodiments.

Figure 4:
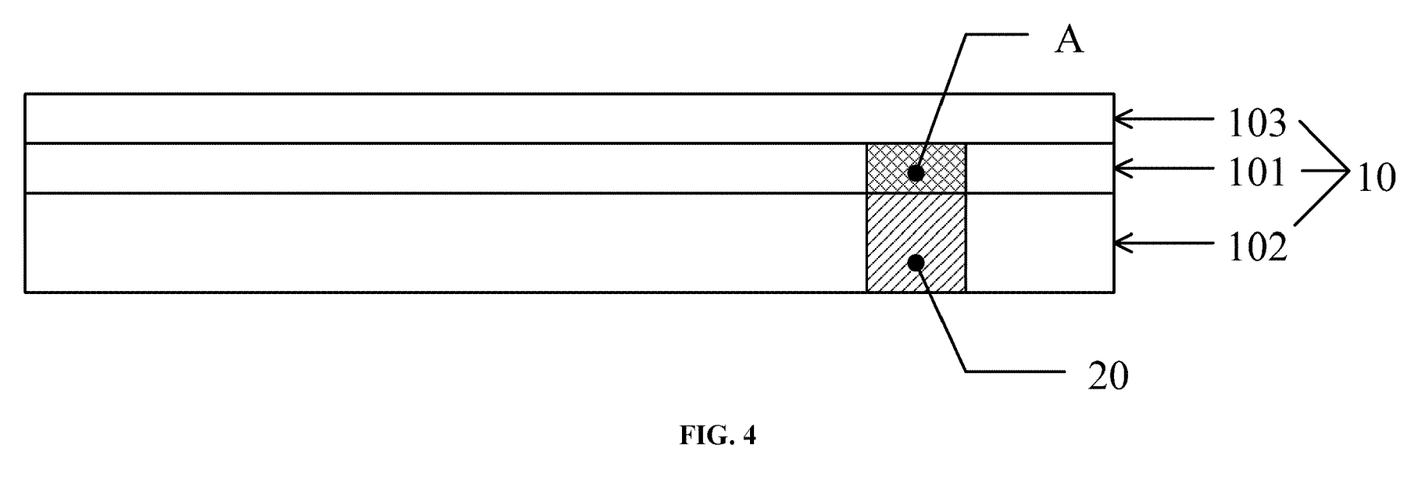
FIG. 4 is a schematic diagram of a structure of a terminal according to an embodiment of the present disclosure.

There is provided a terminal in an embodiment of the present disclosure. As illustrated in FIG. 4, the terminal includes an optical fingerprint sensor 20 and a display module as described in the above methods. Exemplarily, the display module may be the display module 10 as illustrated in FIG. 10. The display module 10 may further include a protective film layer 102 and a transparent cover 103. The optical fingerprint sensor 20 is arranged in an aperture of the protective film layer 102, the optical fingerprint sensor 20 is electrically connected to the processing subcircuit of the display module 10, and a front projection of the aperture on the display panel 101 coincides with a target region A.

The optical fingerprint sensor is configured to detect an optical signal reflected by a pattern of the fingerprint, and generate a current signal according to the optical signal, wherein the optical signal is formed after light emitted by the target image is reflected by the pattern of the fingerprint.

The processing subcircuit is configured to acquire the current signal; and the processing subcircuit is further configured to identify a pattern of the fingerprint according to the current signal.

The fingerprints are invariant features of the human body that are inherently unique and distinguishable from others. The fingerprints consist of a series of fingerprint ridges and fingerprint valleys on the surface of the skin on the fingers. The composition details of these fingerprint ridges and fingerprint valleys generally include forks of the fingerprint ridges, endings of the fingerprint ridges, arch shapes, tent-like arch shapes, leftward whorls, rightward whorls, spiral whorls or double whorls or the like. These details define uniqueness of a fingerprint pattern. Since a light refractive index of the fingerprint ridges is different from a light refractive index of the fingerprint valleys, when the pixels emit light, the intensity of the lights reflected by the fingerprint ridges is different from the intensity of the lights reflected by the fingerprint valleys, and thus an optical signal reflected by the fingerprint ridges is different from an optical signal reflected by the fingerprint valleys. As a result, the current signals generated by the optical fingerprint sensor are also different. Therefore, the processing subcircuit may determine positions of the fingerprint ridges and the fingerprint valleys according to the current signals, thereby implementing the fingerprint identification function. Specifically, the processing subcircuit may determine the pattern of the fingerprint according to the fingerprint ridges and the fingerprint valleys, and compare the determined pattern of the fingerprint with a fingerprint pattern pre-stored in a fingerprint library. If the two patterns coincide with each other, the user may operate the terminal; and if the two patterns do not coincide with each other, the user may not operate the terminal.

Optionally, the terminal may be an AMOLED display device.

Optionally, the terminal may be any product or part with a display function, such as a mobile phone, a tablet computer, a TV, a display, a laptop computer, a digital photo frame, a navigator, etc.

In summary, the terminal according to the embodiments of the present includes a display module. Upon receiving the turn-off screen instruction, the control circuit may control the target region on the display panel to display the target image; and since the target region includes the fingerprint collection region, the display module may display the target region in the fingerprint collection region when the display panel is in the screen-off state, so as to indicate the position of the fingerprint collection region of the user. The user does not need to repeatedly attempt to determine the position of the fingerprint collection region, which simplifies fingerprint collection operations and improves the reliability of fingerprint collection.

The foregoing are only optional embodiments of the present disclosure, and are not intended to limit the present disclosure. Within the spirit and principles of the disclosure, any modifications, equivalent substitutions, improvements, etc., are within the protection scope of the appended claims of the present disclosure.

What is claimed is:

1. A display module, comprising:
   a display panel and a control circuit;
   wherein the control circuit is configured to control a target region on the display panel to display a target image when the display panel is in an off-screen state, the target region comprising a fingerprint collection region;
   the display module further comprises a protective film layer, an optical fingerprint sensor is arranged in an aperture of the protective film layer, the optical fingerprint sensor is electrically connected to the processing subcircuit of the display module, and a front projection of the aperture on the display panel coincides with the fingerprint collection region;
   the optical fingerprint sensor is configured to detect an optical signal reflected by a pattern of the fingerprint, and generate a current signal according to the optical signal, wherein the optical signal is formed after light emitted by the target image is reflected by the pattern of the fingerprint;
   the processing subcircuit is configured to acquire the current signal and identify the pattern of the fingerprint according to the current signal.

2. The display module according to claim 1, wherein the control circuit further comprises an integrated circuit (IC);
   wherein the processing subcircuit is configured to generate a control signal according to the target image, and send the control signal to the IC; and
   the IC is configured to light pixels in the target region according to the control signal, to display the target image.

3. The display module according to claim 2, wherein the target image is a ripple-like pattern, ripples in the ripple-like pattern being scroll displayed according to rules.

4. The display module according to claim 3, wherein each of the pixels that are lit in the target region has the same display duration and brightness.

5. The display module according to claim 3, wherein the ripples in the ripple-like pattern are fingerprints.

6. The display module according to claim 1, wherein the target image comprises a plurality of sequentially arranged pictures, the plurality of sequentially arranged pictures being cyclically displayed on the target region.

7. A display method of a display module, the display module comprising a display panel and a control circuit, and the method comprising:
   upon receiving a turn-off screen instruction, controlling, by the control circuit, a display region on the display panel to display a target image, wherein the target region comprises a fingerprint collection region, and the turn-off screen instruction indicates that the display panel enters a screen-off state,
   wherein the target image is a ripple-like pattern, the control circuit comprises a processing subcircuit and an integrated circuit (IC), and the controlling, by the control circuit, a display region on the display panel to display a target image comprises: generating, by the processing subcircuit, a control signal according to the target image, and sending the control signal to the IC; and periodically lighting, by the IC, n columns of specified pixels in the target region according to a first brightness value, such that the ripples in the ripple-like pattern are scroll displayed according to the rules, n≥1, n being a positive integer; or
   wherein the target image comprises a plurality of sequentially arranged pictures, and the controlling, by the control circuit, a display region on the display panel to display a target image comprises: controlling, by the control circuit, the target region on the display panel to cyclically display the plurality of sequentially arranged pictures.

8. The method according to claim 7, further comprises:
   periodically lighting, by the IC, m columns of specified pixels in the target region according to a second brightness value, such that the ripples in the ripple-like pattern are scroll displayed according to the rules;
   wherein the second brightness value is n/m of the first brightness value, m>n, m being a positive integer.

9. The method according to claim 7, wherein each of the pixels that are lit in the target region has the same display duration and brightness.

10. The method according to claim 7, wherein the ripples in the ripple-like pattern are fingerprints.

11. The method according to claim 7, further comprising:
    upon receiving a turn-on screen instruction, controlling, by the control circuit, the display panel to display to an image to be displayed, wherein the turn-on screen instruction indicates that the display panel enters a screen-on state.

12. A terminal, comprising an optical fingerprint sensor and a display module; wherein the display module comprises:
    a display panel and a control circuit;
    wherein the control circuit is configured to control a target region on the display panel to display a target image when the display panel is in an off-screen state, the target region comprising a fingerprint collection region;

the display module further comprises a protective film layer, the optical fingerprint sensor is arranged in an aperture of the protective film layer, the optical fingerprint sensor is electrically connected to the processing subcircuit of the display module, and a front projection of the aperture on the display panel coincides with the fingerprint collection region;

the optical fingerprint sensor is configured to detect an optical signal reflected by a pattern of the fingerprint, and generate a current signal according to the optical signal, wherein the optical signal is formed after light emitted by the target image is reflected by the pattern of the fingerprint;

the processing subcircuit is configured to acquire the current signal; and the processing subcircuit is further configured to identify the pattern of the fingerprint according to the current signal.

13. The terminal according to claim 12, wherein the control circuit comprises a processing subcircuit and an integrated circuit (IC);

wherein the processing subcircuit is configured to generate a control signal according to the target image, and send the control signal to the IC; and the IC is configured to light pixels in the target region according to the control signal, to display the target image.

14. The terminal according to claim 13, wherein the target image is a ripple-like pattern, ripples in the ripple-like pattern being scroll displayed according to rules.

15. The terminal according to claim 14, wherein each of the pixels that are lit in the target region has the same display duration and brightness.

16. The terminal according to claim 14, wherein the ripples in the ripple-like pattern are fingerprints.

17. The terminal according to claim 12, wherein the target image comprises a plurality of sequentially arranged pictures, the plurality of sequentially arranged pictures being cyclically displayed on the target region.

* * * * *

UNITED STATES PATENT AND TRADEMARK OFFICE
CERTIFICATE OF CORRECTION

PATENT NO.        : 11,386,718 B2
APPLICATION NO.   : 16/305174
DATED             : July 12, 2022
INVENTOR(S)       : Lianbin Liu et al.

Page 1 of 1

It is certified that error appears in the above-identified patent and that said Letters Patent is hereby corrected as shown below:

On the Title Page

Item (22) should read:
(22) PCT Filed: May 11, 2018

Signed and Sealed this
Thirteenth Day of September, 2022

Katherine Kelly Vidal
*Director of the United States Patent and Trademark Office*